(12) United States Patent
Horikawa

(10) Patent No.: US 10,530,987 B2
(45) Date of Patent: Jan. 7, 2020

(54) CONTROL APPARATUS, IMAGE CAPTURING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Yohei Horikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/507,261

(22) Filed: Jul. 10, 2019

(65) Prior Publication Data

US 2019/0335091 A1    Oct. 31, 2019

Related U.S. Application Data

(62) Division of application No. 15/658,519, filed on Jul. 25, 2017, now Pat. No. 10,397,464.

(30) Foreign Application Priority Data

Aug. 1, 2016 (JP) ................................. 2016-151369

(51) Int. Cl.
*H04N 5/232* (2006.01)
*H04N 5/243* (2006.01)

(52) U.S. Cl.
CPC ......... *H04N 5/23212* (2013.01); *H04N 5/243* (2013.01)

(58) Field of Classification Search
CPC ........................ H04N 5/23212; H04N 5/243
See application file for complete search history.

(56) References Cited

U.S. PATENT DOCUMENTS

| | | | |
|---|---|---|---|
| 9,048,152 B2 | 6/2015 | Kishi | |
| 2004/0017744 A1* | 1/2004 | Okazaki | G11B 7/0941 369/44.36 |
| 2008/0112643 A1* | 5/2008 | Kusaka | G03B 13/32 382/278 |
| 2009/0086864 A1 | 4/2009 | Komninakis et al. | |
| 2015/0002838 A1 | 1/2015 | Fukuda et al. | |
| 2015/0244926 A1 | 8/2015 | Inoue | |
| 2016/0224866 A1* | 8/2016 | Imade | G02B 7/38 |

FOREIGN PATENT DOCUMENTS

| | | |
|---|---|---|
| JP | 2013-072906 A | 4/2013 |
| JP | 2015-11283 A | 1/2015 |
| JP | 5852356 B2 | 2/2016 |

\* cited by examiner

*Primary Examiner* — Mekonnen D Dagnew
(74) *Attorney, Agent, or Firm* — Venable LLP

(57) ABSTRACT

A control apparatus (105) includes a normalizer (400, 401) that performs normalization processing on a first signal and a second signal by using normalization coefficients related to the first signal and the second signal, respectively, a correlation calculator (402) that performs correlation calculation with respect to the normalized first and second signals, and a corrector (403, 800, 801) that corrects correlation data to cancel the normalization processing, and the correlation data is based on an output signal from the correlation calculator.

11 Claims, 9 Drawing Sheets

CONTROL APPARATUS, IMAGE CAPTURING APPARATUS, CONTROL METHOD, AND NON-TRANSITORY COMPUTER-READABLE STORAGE MEDIUM

This is a divisional of U.S. patent application Ser. No. 15/658,519, filed Jul. 25, 2017.

BACKGROUND OF THE INVENTION

Field of the Invention

The present invention relates to an image capturing apparatus which performs focus detection.

Description of the Related Art

Conventionally, an image capturing apparatus that performs focus detection to control a focus position has been known. Japanese Patent Laid-open No. 2015-11283 discloses an image capturing apparatus which uses an image sensor that includes a plurality of photoelectric converters (divided pixels) corresponding to one of microlenses arranged in two dimensions to perform the focus detection by a phase difference method. The image capturing apparatus disclosed in Japanese Patent Laid-Open No. 2015-11283 improves a focus detection accuracy by performing filtering processing using a band-pass filter where a signal of a specific frequency band among pixel signals obtained from the divided pixels passes.

Japanese Patent No. 5852356 discloses a method of acquiring a signal of an exposure amount suitable for focus detection by adding divided pixel signals read with a predetermined period. Japanese Patent Laid-open No. 2013-072906 discloses a method of acquiring a satisfactory correlation calculation result by adding correlation calculation results between pixels corresponding to exit pupils divided in a horizontal direction in a direction orthogonal to the horizontal direction.

However, in Japanese Patent Laid-open No. 2015-11283, a signal where the band-pass filter is applied does not necessarily have an amplitude suitable for focus detection calculation. Japanese Patent Laid-open No. 2015-11283 discloses, as examples of the band-bass filer, {1,4,4,4,0,−4,−4,−4,−1} for extracting edges by cutting DC components and {1,2,1} for suppressing high-frequency noise components. When such a band-pass filter is applied to a digital signal, generally, it is designed to perform the normalization with a sum of absolute values of filter coefficients of each tap so as to suppress the amplitude of the signal to have a bit width of the signal before applying the bandpass filter.

In this case, when a band-pass filter for making a signal in a high frequency band pass is applied to an object with low contrast, a signal without amplitude can be obtained. Even when a band-pass filter for making a signal in a low frequency band pass is applied to an object with a lot of high frequency components, similarly, a signal without amplitude can be obtained. If focus detection processing is performed based on such a signal that does not have amplitude, there is a possibility that focus detection accuracy is lowered.

When the normalization is not performed with the sum of the absolute values of the filter coefficients of each tap, limiter processing for suppressing the bit width to a predetermined bit width after the normalization is required. When the limiter processing is performed by applying a high-pass filter to an object with a high frequency component, a portion where the amplitude should originally appear becomes a signal stuck to an upper limit value of the limiter in some cases. Even in this case, there is a possibility that the focus detection accuracy is lowered.

When normalization processing is not performed, a result where the absolute values of the filter coefficients of each tap are multiplied may be output in some cases. In order to guarantee the output as a result of calculation, it is necessary to extend the bit width of a circuit subsequent to the filter processing using the band-pass filter to the bit width resulting from the multiplication of the absolute values of the filter coefficients of each tap, and thus a large size of the circuit is required.

Even when the divided pixels are added in a predetermined time unit as disclosed in Japanese Patent No. 5852356, sufficient amplitudes are not necessarily obtained in signals of a predetermined band. Even when the results of the correlation calculation are added in a row direction as disclosed in Japanese Patent Application Laid-Open No. 2013-072906, it is difficult to surely prevent the reduction of the focus detection accuracy since the addition is performed between the correlation calculation results based on signals with insufficient amplitudes.

SUMMARY OF THE INVENTION

The present invention provides a control apparatus, an image capturing apparatus, a control method, and a non-transitory computer-readable storage medium which are capable of performing highly accurate focus detection independently of a frequency component of a signal.

A control apparatus as one aspect of the present invention includes a normalizer configured to perform normalization processing on a first signal and a second signal by using normalization coefficients related to the first signal and the second signal, respectively, a correlation calculator configured to perform correlation calculation with respect to the normalized first and second signals, and a corrector configured to correct correlation data to cancel the normalization processing, the correlation data being based on an output signal from the correlation calculator.

A control apparatus as another aspect of the present invention includes a normalizer configured to perform normalization processing on a first signal and a second signal by using normalization coefficients with respect to the first signal and the second signal, respectively, and a correlation calculator configured to perform correlation calculation with respect to the normalized first and second signals, the normalizer includes a first filter configured to perform band-pass filtering processing in a first frequency band with respect to the first signal and the second signal, a second filter configured to perform band-pass filtering processing in a second frequency band including the first frequency band, a detector configured to detect a peak value of each of the first and second signals passing through the second filter, and a calculator configured to calculate the normalization coefficient based on a signal output from the detector, and the correlation calculator is configured to perform the correlation calculation with respect to the first and second signals passing through the first filter.

An image capturing apparatus as another aspect of the present invention includes an image sensor including a first photoelectric converter and a second photoelectric converter that receive light beams passing through pupil regions of an image capturing optical system different from each other, an acquirer configured to acquire a first signal and a second signal that correspond to output signals from the first photoelectric converter and the second photoelectric converter, respectively, a normalizer configured to perform normalization processing on the first signal and the second signal by using normalization coefficients related to the first signal and the second signal, respectively, a correlation calculator configured to perform correlation calculation with respect to the normalized first and second signals, and a corrector configured to correct correlation data to cancel the normalization processing, the correlation data being based on an output signal from the correlation calculator.

A control method as another aspect of the present invention includes performing normalization processing on a first signal and a second signal by using normalization coefficients related to the first signal and the second signal, respectively, performing correlation calculation with respect to the normalized first and second signals, and correcting correlation data to cancel the normalization processing, the correlation data being based on an output signal from the correlation calculator.

A non-transitory computer-readable storage medium storing a program which causes a computer to execute the control method.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Embodiment 1

Figure 1:
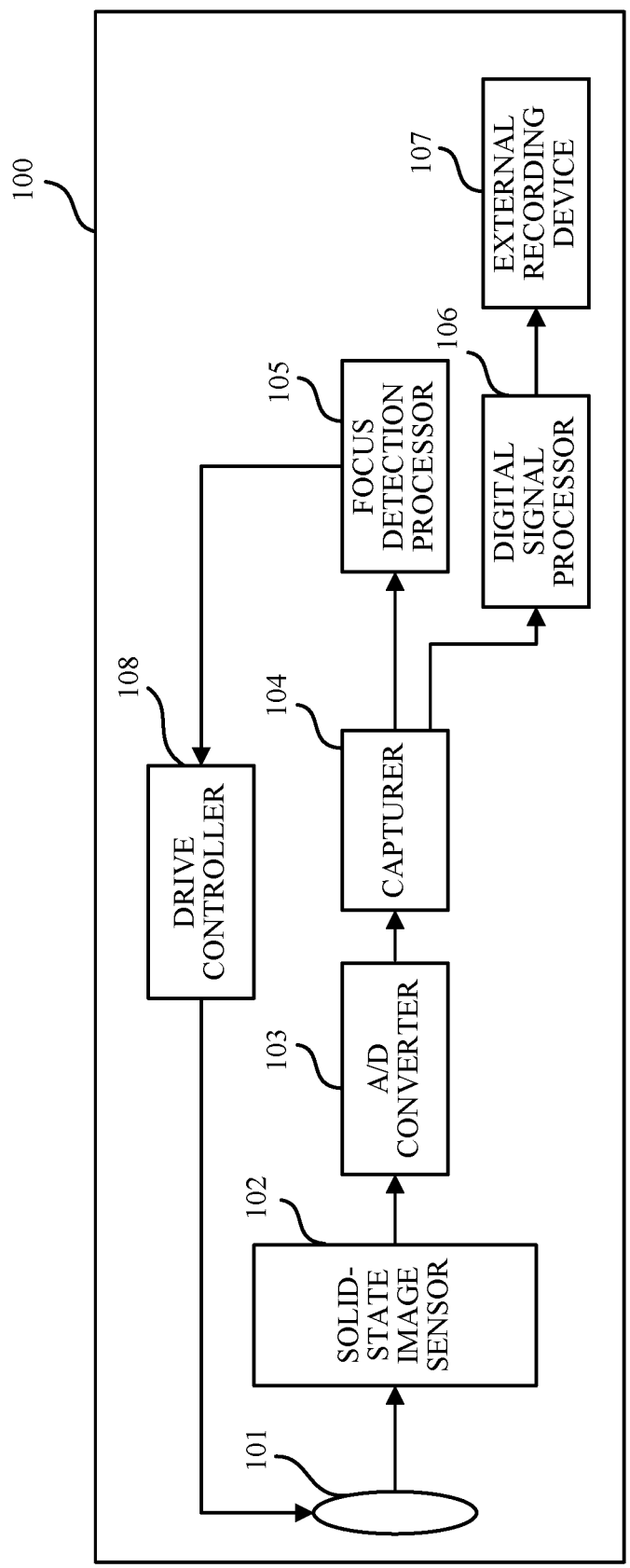
FIG. 1 is a block diagram of an image capturing apparatus in each embodiment.

First, referring to FIG. 1, a configuration of an image capturing apparatus in Embodiment 1 of the present invention will be described. FIG. 1 is a block diagram of an image capturing apparatus 100 in this embodiment. In FIG. 1, a configuration which is not directly related to the features of this embodiment is omitted.

An optical system unit 101 (image capturing optical system) includes a lens unit including a focus lens for adjusting focus (i.e., focusing), a shutter, an aperture stop, a lens controller, and the like. The optical system unit 101 is driven based on an output signal (drive signal) from a drive controller 108. The drive controller 108 outputs the drive signal for driving the focus lens included in the optical system unit 101 according to a defocus amount output from a focus detection processor 105 described below. A solid-state image sensor 102 is a CMOS image sensor in which unit pixel cells are arrayed in a two-dimensional matrix, and exposure control is performed by the shutter and the aperture stop included in the optical system unit 101.

Figure 2A:
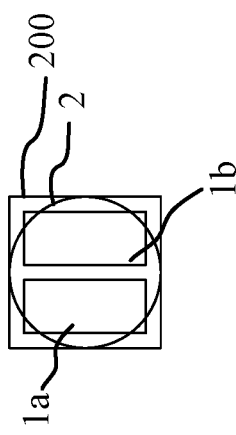
FIGS. 2A and 2B are pixel array diagrams of a solid-state image sensor in each embodiment.
Figure 2B:
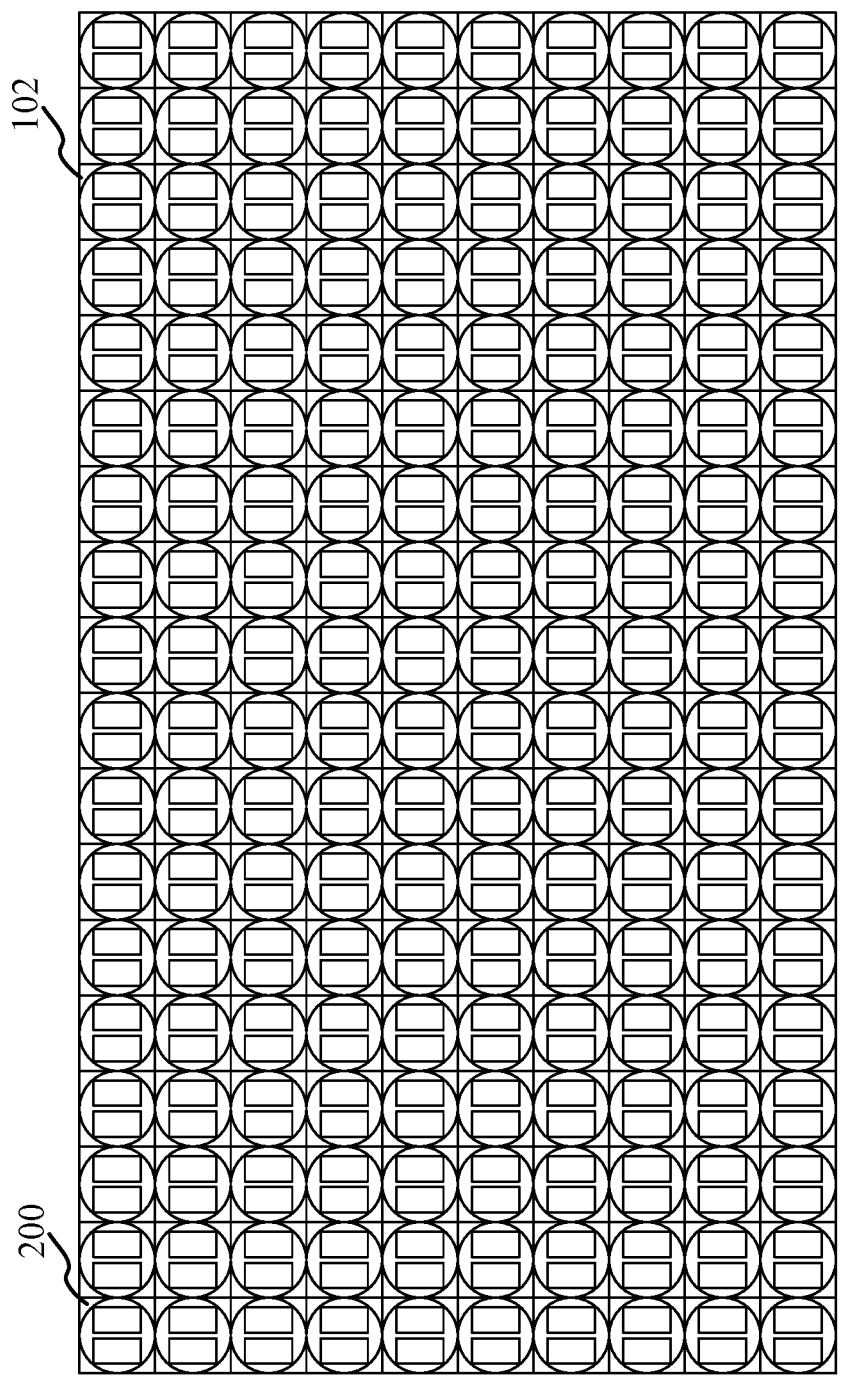

Referring to FIGS. 2A and 2B, the unit pixel cell of the solid-state image sensor 102 will be described. FIGS. 2A and 2B are pixel array diagrams of the solid-state image sensor 102, FIG. 2A illustrates a configuration of the unit pixel cell 200, and FIG. 2B illustrates an array (i.e., Bayer array) of the unit pixel cells 200.

As illustrated in FIG. 2A, the unit pixel cell 200 includes one microlens 2, a plurality of (two) photoelectric converters 1a and 1b (i.e., divided pixels or divided PDs) corresponding to one microlens 2 (i.e., sharing one microlens 2). In this embodiment, the number of photoelectric converters (divided pixels) sharing one microlens 2 is two, but this is not limited thereto. For example, four photoelectric converters sharing one microlens may be provided. By receiving incident light through the same microlens 2, the photoelectric converters 1a and 1b can obtain pupil-divided images according to their arrangement. Hereinafter, the images obtained by the photoelectric converters 1a and 1b are referred to as an image A and an image B, respectively. As illustrated in FIG. 2B, the solid-state image sensor 102 is configured by arraying a plurality of unit pixel cells 200 in two dimensions. That is, the solid-state image sensor 102 has a first photoelectric converter (photoelectric converter 1a) and a second photoelectric converter (photoelectric converter 1b) with respect to one microlens 2, and the plurality of microlenses 2 are arrayed in two dimensions.

An A/D converter 103 has an analog signal processor (not illustrated) such as a CDS circuit and a nonlinear amplification circuit for removing a noise on a transmission path. Furthermore, the A/D converter 103 performs predetermined analog signal processing on an analog electric signal that is obtained by analog signal processing and that is output from the solid-state image sensor 102, and then it converts the analog electric signal into a digital electric signal (pixel signal). The digital electric signal is output to a capturer 104. In this embodiment, the solid-state image sensor 102 includes the first photoelectric converter (photoelectric converter 1a) and the second photoelectric converter (photoelectric converter 1b) that receive light beams passing through different pupil regions of the optical system unit 101 (image capturing optical system).

The capturer 104 (acquirer) acquires the first signal and the second signal corresponding to the output signals from the first photoelectric converter and the second photoelectric converter, respectively. Furthermore, the capturer 104 determines an effective period and a type of the pixel signal, and it outputs the pixel signals of the images A and B (i.e., first signal and second signal) to the focus detection processor 105 and a digital signal processor 106. The focus detection processor 105 calculates an image shift amount between the image A and the image B. The drive controller 108 drives the focus lens of the optical system unit 101 based on the defocus amount output from the focus detection processor 105.

Figures 3A, 3B, 3C:
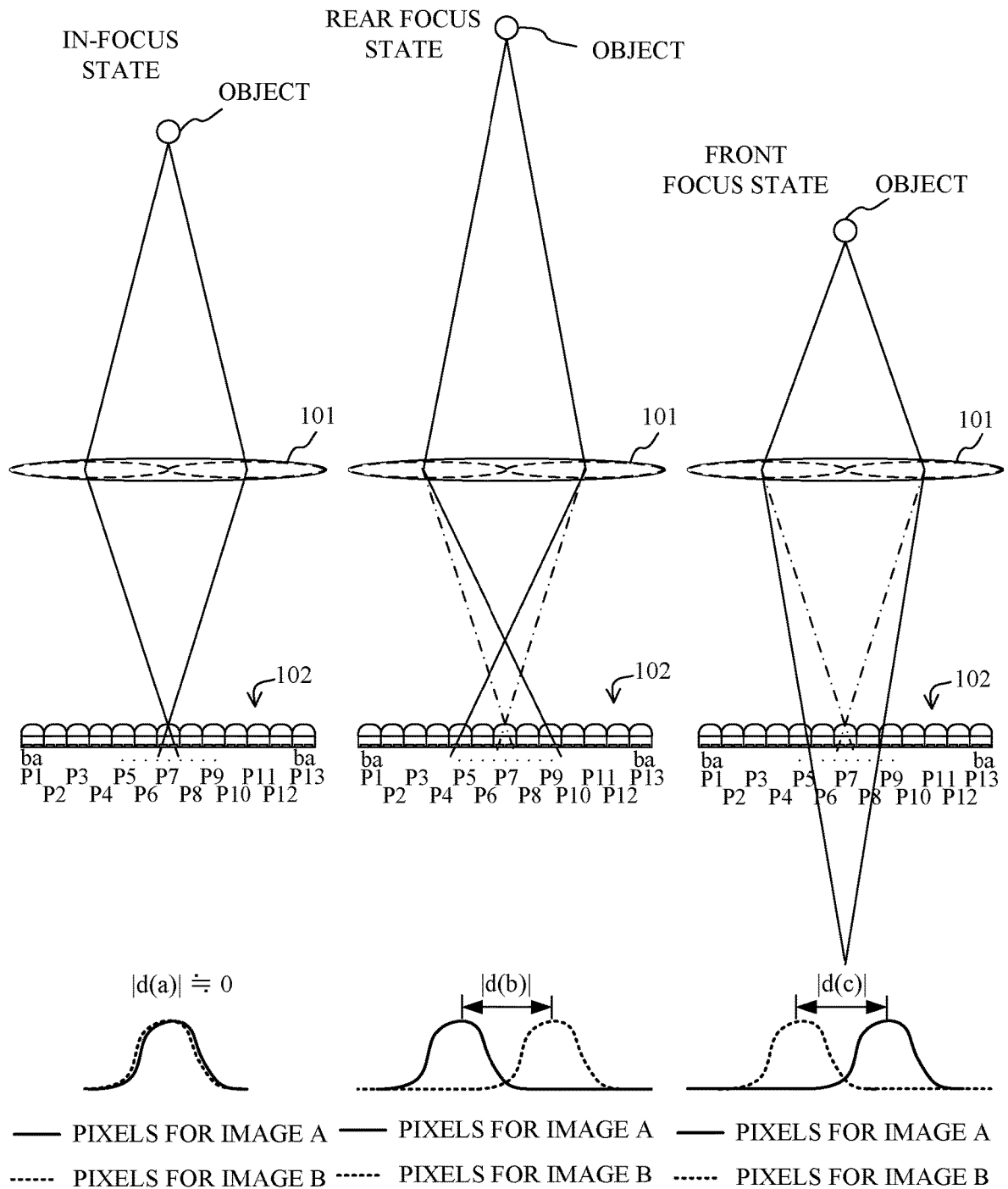
FIGS. 3A to 3C are conceptual diagrams in a case where a focus detection operation (focusing operation) is performed by using pixel values of divided PDs in each embodiment.

Next, referring to FIGS. 3A to 3C, focus detection operation (focusing operation) of the image capturing apparatus 100 in this embodiment will be described. FIGS. 3A to 3C are conceptual diagrams in the case where the focus detection operation (focusing operation) is performed by using the pixel values of the divided PDs (pixels 1a and 1b) in this embodiment, FIGS. 3A to 3 C illustrate an in-focus state, a rear focus state, and a front focus state, respectively.

In FIGS. 3A to 3C, the solid-state image sensor 102 includes the plurality of unit pixel cells 200 described referring to FIG. 2, and the unit pixel cells 200 are illustrated as P1 to P13 according to their positions (pixel positions). The photoelectric converters 1a and 1b of the unit pixel cell 200 are illustrated as "a" and "b", respectively. As described above, in the solid-state image sensor 102, the plurality of unit pixel cells 200 including the photoelectric converters a and b separately arranged under one microlens are arranged. As disclosed in Japanese Patent Laid-open No. 2015-11283, the photoelectric converters a and b arranged under one microlens are pupil-divided pixels with this microlens as an exit pupil.

In the focus detection, outputs of the pixels for the image A and the pixels for the image B from the photoelectric converters a and b are combined in a column direction (or a row direction), respectively, and the image A and the image B are generated as outputs of a unit pixel cell group of the same color, and the deviation of each corresponding point is obtained by correlation calculation (SAD calculation). The result of the correlation calculation is obtained by expression (1) below.

$$C = \Sigma |YAn - YBn| \quad (1)$$

In expression (1), symbol n is the number of microlenses in a horizontal direction. Symbols YAn and YBn are luminance signals of the images A and B corresponding to the n-th microlens, respectively. A value obtained by shifting the corresponding pixel with respect to the luminance signal YBn of the image B is plotted, and the position where the shift amount is minimized is the in-focus position.

As illustrated in FIG. 3A, in the in-focus state, an object image is formed on the pixels a and b of the unit pixel cell P7. Therefore, the pixels for the image A (i.e., pixels a) and the pixels for the image B (pixel b) substantially coincide with each other. In this case, an image shift amount d(a) of the pixels for the image A and the pixels for the image B obtained by the correlation calculation is substantially equal to 0 (|d(a)≈0). On the other hand, as illustrated in FIG. 3B, in the rear focus state, the object image is formed on the pixel a of the unit pixel cell P9 (pixel for the image A) and the pixel b of the unit pixel cell P5 (pixel for the image B). In this case, an image shift amount d(b) of the image A and the image B obtained by the correlation calculation occurs. Furthermore, as illustrated in FIG. 3C, in the case of the front focus state, the object image is formed on the pixel a of the unit pixel cell P5 (pixel for the image A) and the pixel b of the unit pixel cell P9 (pixel for the image B). In this case, an image shift amount d(c) in the opposite direction to the case of the rear focus state occurs as an image shift amount of the pixels for the images A and B obtained by the correlation calculation.

That is, it means that in the in-focus state, the pixel for the image A and the pixel for the image B views the same object, but in the rear focus state and the front focus state, the pixel for the image A and the pixel for the image B views an object that is shifted (i.e., displaced) by the image shift amount d. The drive controller 108 can perform the focusing operation on the object based on the defocus amount calculated by the well-known technique based on the image shift amount d where the correlation calculation result is minimized and a base line length.

Figure 4:
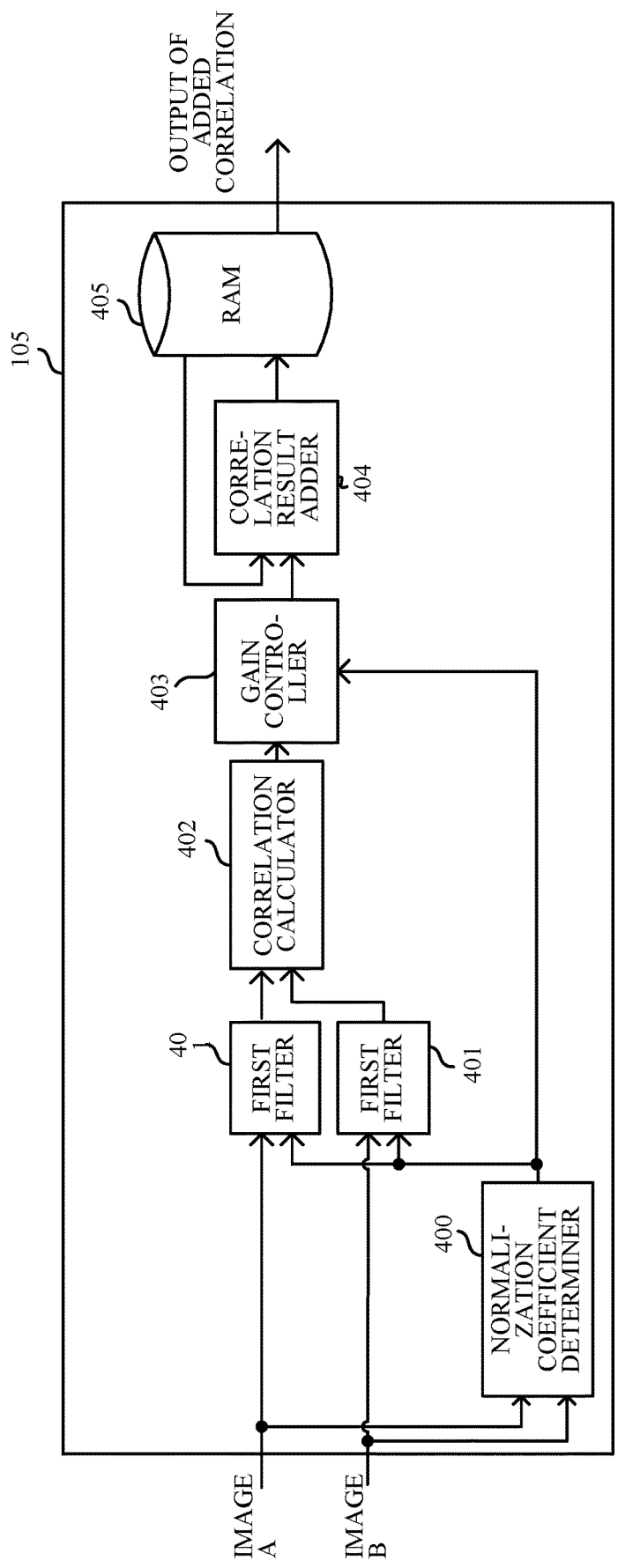
FIG. 4 is a block diagram of a focus detection processor in Embodiment 1.

Next, referring to FIG. 4, a specific configuration and data flow of the focus detection processor 105 will be described. FIG. 4 is a block diagram of the focus detection processor 105.

The image A and the image B separated by the capturer 104 are input to the focus detection processor 105. The image A and the image B are input to a normalization coefficient determiner 400 and the first filter 401. Based on the image A and the image B, the normalization coefficient determiner 400 calculates a normalization coefficient (normalization gain) so that the amplitude of the signal processed by the first filter 401 has an appropriate range for the bit width of the bus). The calculated normalization coefficient (normalization gain) is output to the first filters 401 and a gain controller 403. Such a gain control technique is called auto gain control.

Figure 5:
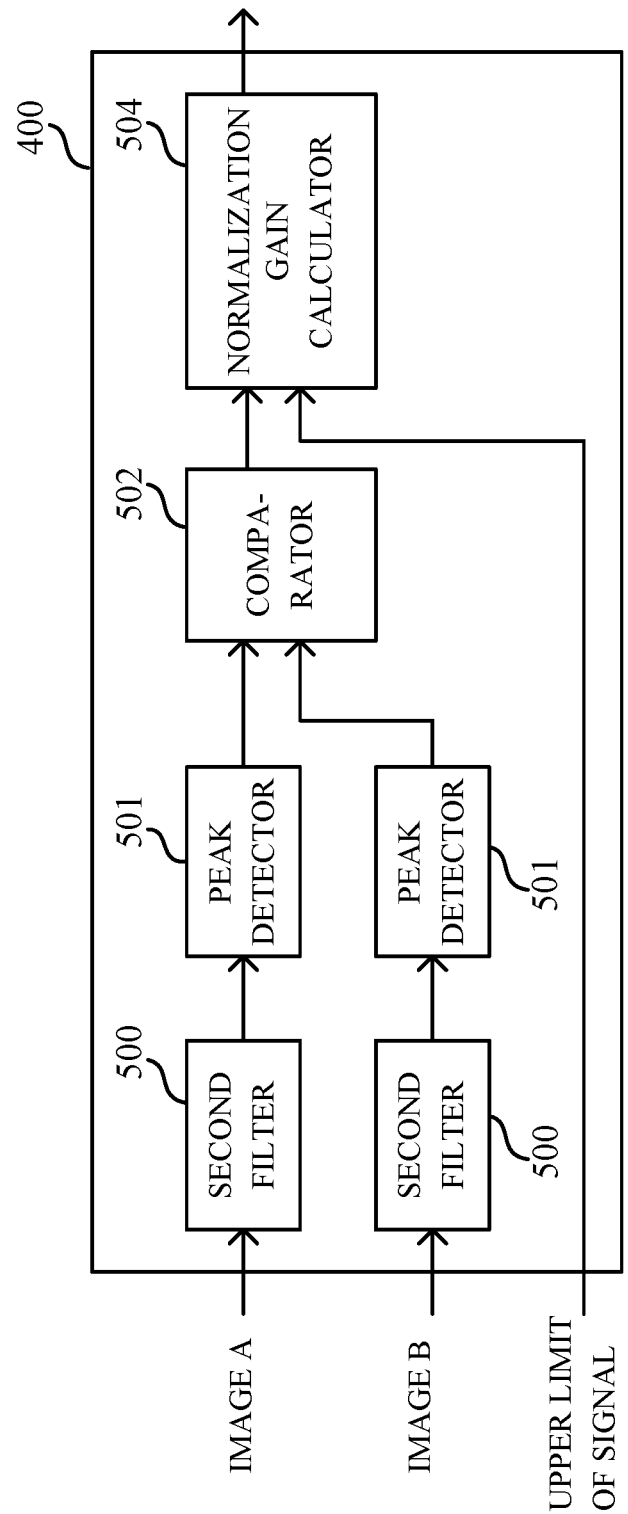
FIG. 5 is a block diagram of a normalization coefficient determiner in each embodiment.

Reference to FIG. 5, a specific configuration of the normalization coefficient determiner 400 will be described. FIG. 5 is a block diagram of the normalization coefficient determiner 400. In the normalization coefficient determiner 400, the image A and the image B are input to second filters 500. The second filter 500 extracts a signal of a predetermined frequency band (second frequency band) from each of the image A and the image B, and it outputs the signal to a peak detector 501. The peak detector 501 calculates amplitudes of the image A and the image B from which the predetermined frequency band is extracted, and it outputs the amplitudes to the comparator 502. The comparator 502 compares the calculated peak value of the image A with the peak value of the image B. Then, the comparator 502 selects the larger one of the peak values of the image A and the image B, and outputs it to a normalization gain calculator 504.

The normalization gain calculator 504 calculates the normalization gain g by dividing a signal upper limit value x for compressing the output signal of the first filter 401 to a predetermined bit width by an output signal y of the comparator 502 (G=x/y). The specific description will be described below. When the output signal of the first filter 401 is 10 bits and the detected peak value is 384, the upper limit value 1023 expressed by 10 bits is divided by 384 to obtain a normalization coefficient for enlarging the amplitude. On the other hand, when the detected peak value is 1280, the amplitude is compressed by dividing 1023 by 1280, and thus the output signal of the first filter 401 can be accommodated (limited) to a predetermined bit width. Preferably, a frequency band (second frequency band) extracted by the second filter 500 is wider than a frequency band (first frequency band) extracted by the first filter 401. As a result, the output signal of the first filter 401 can be surely compressed or enlarged to a predetermined bit width.

Figure 7:
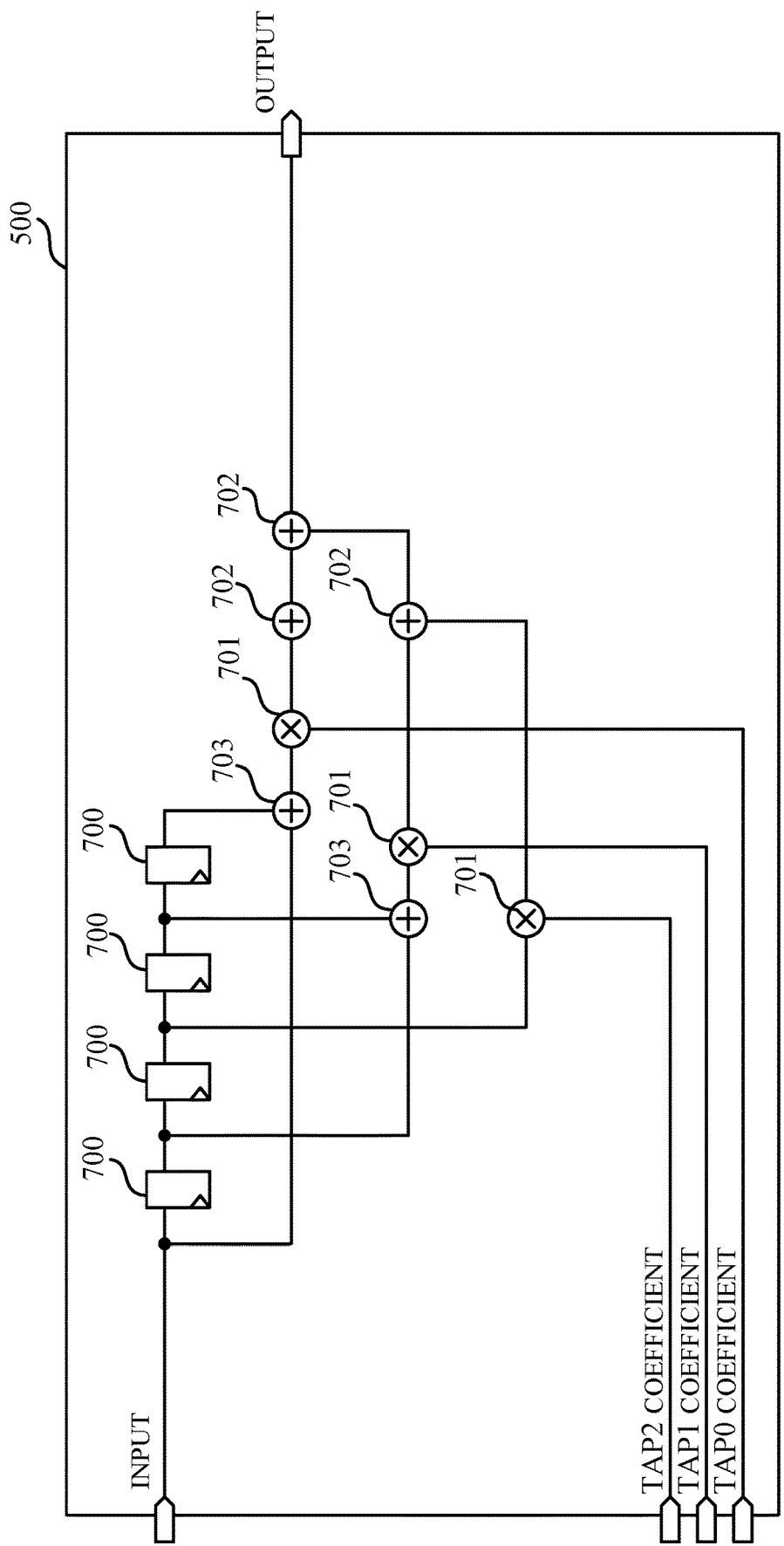
FIG. 7 is a block diagram of a second filter in each embodiment.

Next, referring to FIG. 7, a configuration of the second filter 500 in the normalization coefficient determiner 400 will be described. FIG. 7 is a block diagram of the second filter 500. In this embodiment, for the sake of simplicity of explanation, a case where a five-TAP band-pass filter is applied will be described.

The second filter 500 includes a delay element 700, an addition element 703 for adding symmetric taps, a multiplication element 701 for multiplying tap coefficients, and an addition element 702 for adding the multiplication results. In order to make the linear phase characteristic constant, generally, a line symmetric or point symmetric filter is formed with respect to the center TAP. Therefore, the addition element 703 performs addition of 0 TAP and 4 TAP and addition of 1 TAP and 3 TAP, respectively, and the multiplication element 701 multiplies the TAP coefficients. The point symmetric filter can be realized by using a subtraction element instead of the addition element. By adding the multiplication results of the respective TAP coefficients by the addition element 702 to be output, the predetermined frequency band can be extracted. In such a circuit, normalization is generally performed, but in this embodiment, the normalization processing is not performed since the second filter 500 aims to accurately obtain the amplitude of the result of the band-pass filter.

In order to calculate the normalization gain based on the approximate amplitude, the input bit widths of the image signal A and the image signal B of the second filter 500 may be reduced by bit shift. Furthermore, by normalizing the signal output from the second filter 500, it is possible to reduce the scale of the peak detector 501, the comparator 502, and the normalization gain calculator 504. For example, when bit shifting is performed to delete 3 bits of LSB of one of the input and output of the second filter 500, the peak value where the bit shift is performed is 48 while the peak value where the bit shift is not performed is 384. Even for the upper limit value of 1023 of the output signal of the first filter 401, 127 shifted by 3 bits may be divided by 48.

In the processing, although the accuracy of the calculated normalization gain decreases, it is possible to suppress the bit width of the output of the first filter 401 to a predetermined bit width. In this case, even if the output bit width is ensured by inserting the limiter processing in an output portion of the first filter 401, the range of the amplitude lost by the limiter is very small, and therefore the influence on the focus detection accuracy is minor. Based on the calculated normalization coefficient, the image A and the image B pass through the first filter 401, and a signal of a predetermined frequency band is output to a correlation calculator 402.

Figure 6:
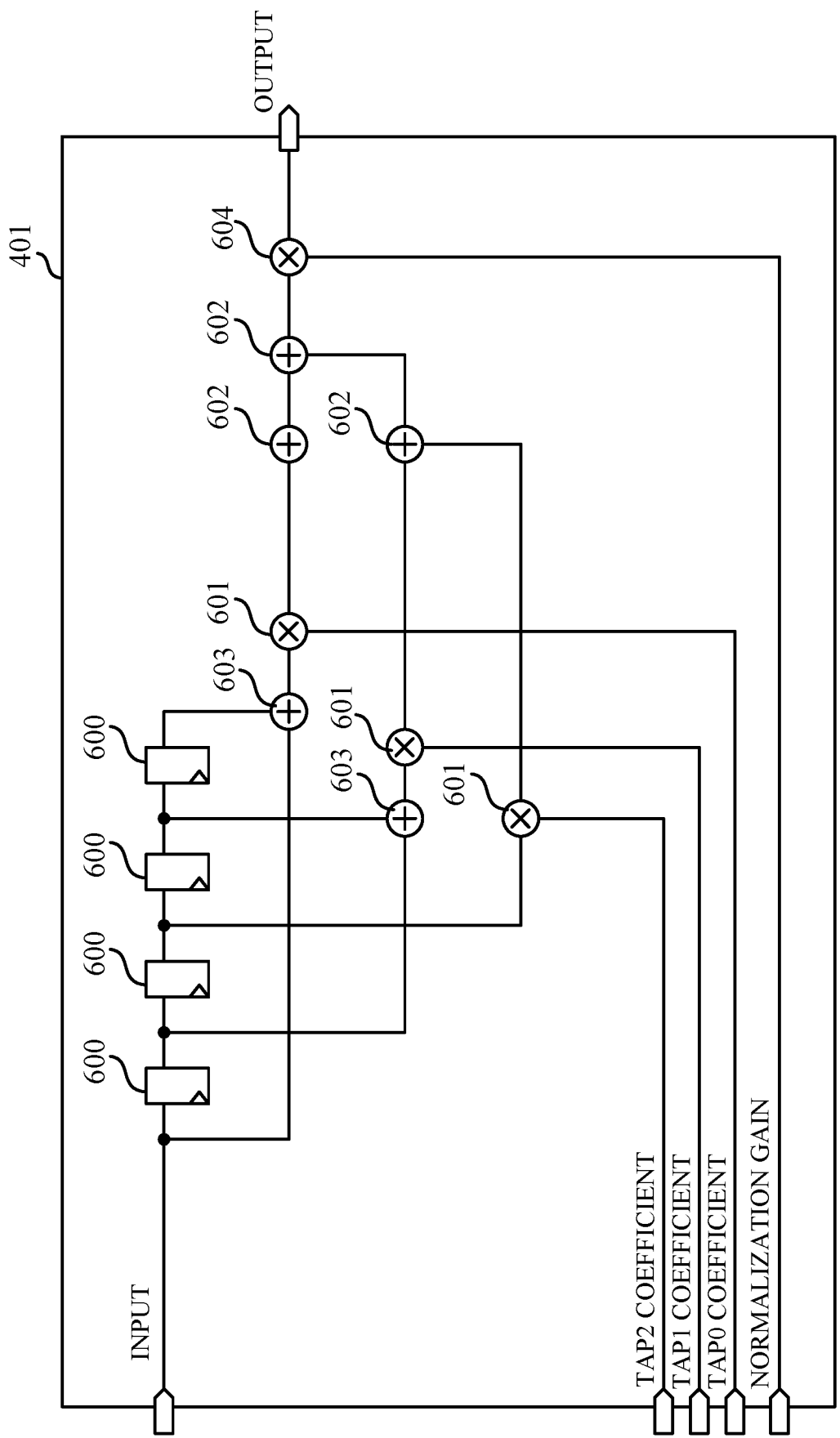
FIG. 6 is a block diagram of a first filter in each embodiment.

Next, referring to FIG. 6, a configuration of the first filter 401 in the focus detection processor 105 will be described. FIG. 6 is a block diagram of the first filter 401. As illustrated in FIG. 6, the first filter 401 includes a delay element 600, a multiplication element 601, and addition elements 602 and 603 similarly to the delay element 700, the multiplication element 701, and the addition elements 702 and 703 of the second filter 500, respectively. In addition, the first filter 401 includes a multiplication element 604 of the normalization gain for multiplying the normalization gain.

In FIG. 4, the correlation calculator 402 of the focus detection processor 105 performs correlation calculation processing on the output signal of the first filter 401 related to each of the image A and the image B by the SAD calculation described above, and it outputs the correlation calculation result to the gain controller 403. The gain controller 403 corrects the correlation calculation result by multiplying the correlation calculation result calculated by the correlation calculator 402 by the reciprocal of the normalization coefficient applied by the first filter 401, and it outputs the corrected result to a correlation result adder 404.

With respect to the first row of a focus detection frame, the correlation result adder 404 outputs the correlation result to the RAM 405 (storage device) without performing the addition processing. With respect to each of the second and subsequent rows of the focus detection frame, the correlation result adder 404 adds the correlation calculation result of a certain row and the correlation calculation result added up to the previous row to obtain the correlation addition result, and it outputs the correlation addition result to the RAM 405. The focus detection processor 105 reads, from the RAM 405, the correlation calculation result obtained by correlation addition for the preset number of rows. Then, the focus detection processor 105 calculates the defocus amount based on the image shift amount d, and it outputs the defocus amount to the drive controller 108.

As described above, in this embodiment, the gain controller 403 multiplies the output signal (correlation calculation result) of the correlation calculator 402 by the reciprocal of the normalization coefficient. As a result, it is possible to equalize the contribution ratio of each row with respect to the correlation addition result. If the contribution rate with respect to the correlation addition result is not equalized, the amplitude of the correlation calculation result increases since the normalization gain applied to the first filter 401 in the row having a low contrast is large. In this case, the noise included in the correlation calculation result is amplified in calculating the correlation addition result, which is not preferable. On the other hand, since the gain applied to the first filter 401 is small in the row having a high contrast, the amplitude of the correlation calculation result is compressed. In this case, since the contribution ratio of the originally highly-reliable row having the high contrast is decreased, there is a possibility that an appropriate correlation addition result cannot be obtained.

As described above, by obtaining the normalization coefficients for the image signal A and the image signal B in each row, it is possible to appropriately obtain the output amplitude of the first filter 401 in the row having the low contrast even when the low-contrast row and the high-contrast row are mixed in the focus detection frame. By performing addition for each coefficient of the normalization coefficient determiner 400, it is possible to obtain the correlation calculation results for the low-contrast row and the high-contrast row.

Figure 9:
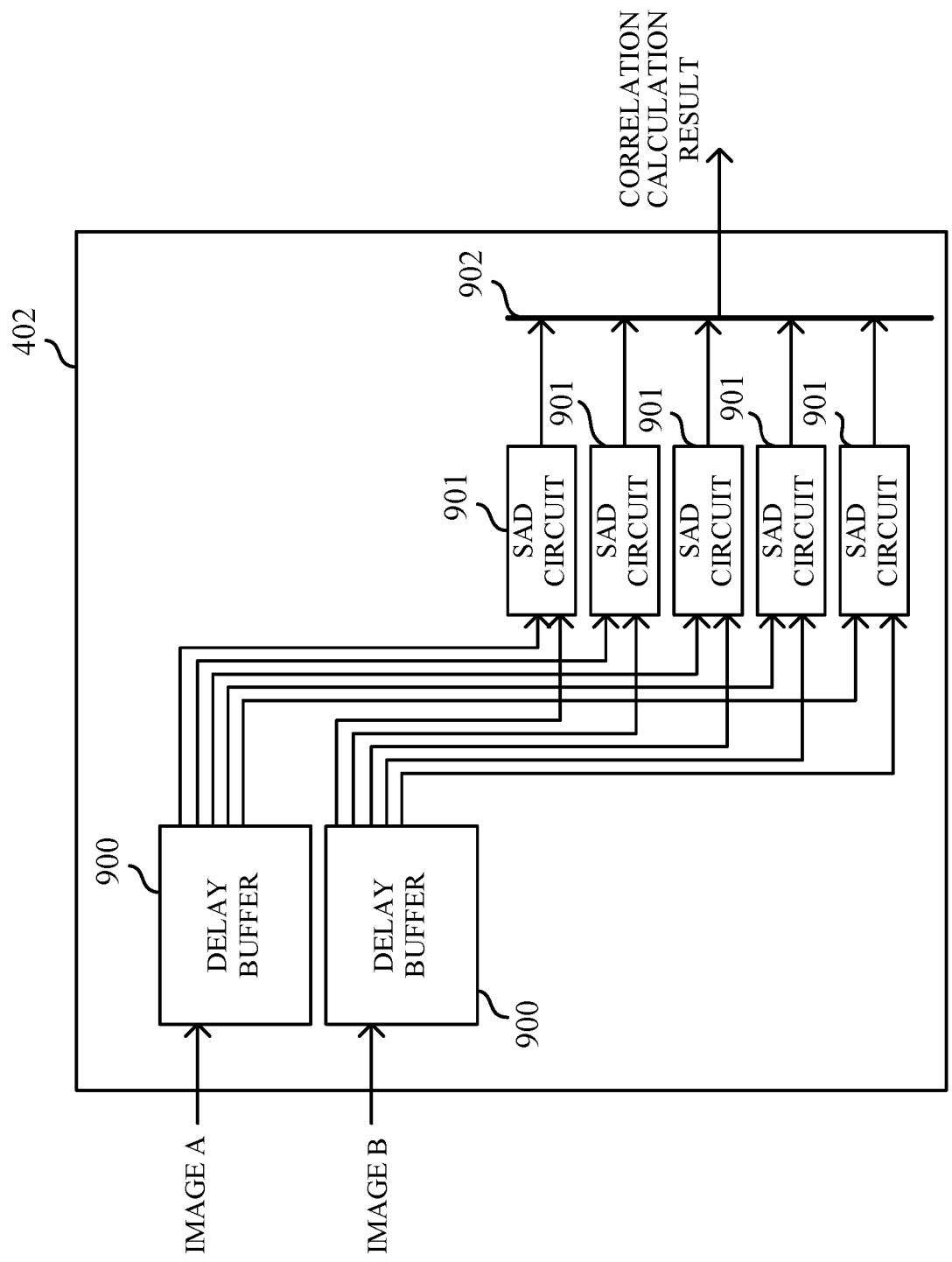
FIG. 9 is a block diagram of a correlation calculator in each embodiment.

Next, referring to FIG. 9, a configuration of the correlation calculator 402 will be described. FIG. 9 is a block diagram of the correlation calculator 402. The correlation calculator 402 includes a delay buffer 900, an SAD circuit 901, and an output selector 902. The number of steps (delay step number) of the delay buffer 900, the number of the SAD circuits 901, and the source of the output selector 902 increase or decrease depending on the number of shift operations in the correlation operation processing. The correlation calculator 402 in FIG. 9 illustrates a case of ±2 shifts as an example, the number of steps of the delay buffer 900 is five, the number of the SAD circuits is five, and the source of the output selector 902 is five. Since the number of shift operations in the correlation calculation processing increases as the detection range of the defocus amount becomes wide, the circuit scale is enormous. Therefore, by using the normalization coefficient determiner 400 of this embodiment, the circuit scale may be reduced.

In FIG. 1, the digital signal processor 106 of the image capturing apparatus 100 performs addition processing between divided pixels on the image signal A and the image signal B input in the Bayer array, and it also performs digital signal processing such as synchronization processing, gamma processing, and noise reduction processing. The digital signal processor 106 converts the image data to which such digital signal processing is applied into compressed image data such as JPEG. The image data (compressed image data) from the digital signal processor 106 is output to and recorded in an external recording device 107. Since the synchronization processing, the gamma processing, the noise reduction processing, the JPEG compression processing, and the like are not directly related to the present invention, detailed descriptions thereof are omitted.

According to this embodiment, highly accurate focus detection processing can be performed independently of the frequency component of the object image (signal). In this embodiment, a common normalization gain is applied to the image A and the image B, but the present invention is not limited thereto. The normalization gain may be applied to each of the image A and the image B individually (i.e., independently). When the normalization gain is individually applied, it is possible to reduce the influence of shading caused by the divided pixel structure of the image A and the image B.

Embodiment 2

Next, Embodiment 2 of the present invention will be described. In Embodiment 1, the configuration where the gain controller 403 performs the correction processing based on the normalization gain of the first filter 401 is described in order to make the contribution ratio of the correlation calculation result of each row to be constant with respect to the correlation addition result. On the other hand, in this embodiment, a configuration where the contribution ratio of the correlation calculation result of each row is made uniform (substantially constant) without performing gain control on the correlation calculation result. That is, in this embodiment, by performing the gain control on the correlation addition result up to the previous row, the contribution ratio of the correlation calculation result of each row is made substantially constant. This embodiment is the same as the first embodiment except for the focus detection processor, and accordingly common descriptions thereof will be omitted.

Figure 8:
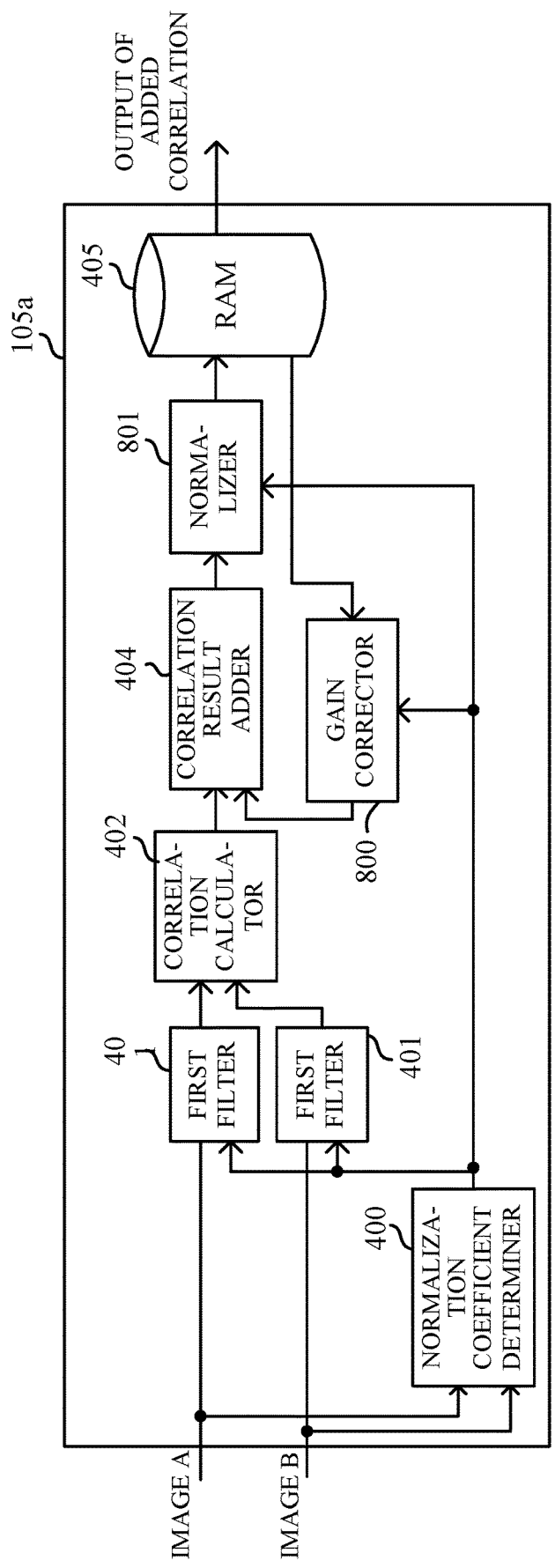
FIG. 8 is a block diagram of a focus detection processor in Embodiment 2.

Referring to FIG. 8, a focus detection processor 105*a* in this embodiment will be described. FIG. 8 is a block diagram of the focus detection processor 105*a*.

The correlation addition result (first correlation addition data) up to the previous row before being read from the RAM 405 is input to a gain corrector 800 that corrects the gain of the correlation addition result. The gain corrector 800 multiplies the input correlation addition result by the normalization gain (normalization coefficient) that is similar to that of the first filter 401, and it outputs the result to the correlation result adder 404. The correlation result adder 404 adds the input signal (correlation addition result obtained by multiplying the normalization gain) from the correlation result adder 404 and the correlation calculation result of the current row to generate second correlation addition data, and it outputs the second correlation addition data to a normalizer 801 that performs normalization processing on the correlation addition result. The normalizer 801 performs the normalization processing by dividing by the value of twice the normalization coefficient multiplied by the first filter 401 and the gain corrector 800, and it outputs the result of the normalization processing to the RAM 405. The focus detection processor 105*a* reads correlation calculation results correlated and added for the preset number of rows from the RAM 405, calculates the defocus amount based on the image shift amount d, and outputs the defocus amount to the drive controller 108.

According to this embodiment, it is possible to make the contribution ratio of the correlation calculation result of each row to the correlation addition result constant without performing the normalization processing on the correlation calculation result of the input row.

As described above, in each embodiment, the control apparatus (focus detection processor 105 or 105*a*) includes the normalizer, the correlation calculator 402, and the corrector. Preferably, the normalizer includes the normalization coefficient determiner 400 and the first filter 401. Preferably, the corrector includes the gain controller 403, or the gain corrector 800 and the normalizer 801. The normalizer (the normalization coefficient determiner 400 and the first filter 401) performs normalization processing on a first signal (i.e., signal corresponding to a signal from the first photoelectric converter) and a second signal (i.e., signal corresponding to a signal from the second photoelectric converter) by using normalization coefficients related to the first signal and the second signal, respectively. The correlation calculator performs correlation calculation with respect to the normalized first and second signals. The corrector corrects correlation data that is based on an output signal from the correlation calculator to cancel the normalization processing. Correcting the correlation data to cancel the normalization processing means correcting the correlation data to reduce or cancel an influence caused by the normalization coefficients (normalization gains) applied when the correlation calculation of the first signal and the second signal is performed.

Preferably, the normalizer controls the normalization gain of each of the first signal and the second signal by the normalization processing. The corrector corrects the correlation data to cancel the normalization gain. Preferably, the control apparatus includes the correlation adder (correlation result adder 404) that adds the output signals from the correlation calculator. The correlation adder adds the output signals in a predetermined direction within a range of a focus detection frame to output correlation addition data. More preferably, the predetermined direction is a direction (for example, a row direction) that is orthogonal to a parallax direction (for example, a column direction).

Preferably, the correlation data corresponds to the output signals from the correlation calculator. In this case, the correlation adder adds the output signals corrected by the corrector in the predetermined direction to output the correlation addition data. Preferably, the correlation data corresponds to the correlation addition data from the correlation adder. In this case, the corrector corrects the correlation addition data to cancel the normalization processing. More preferably, the corrector includes the gain corrector 800 and the normalizer 801. The corrector (gain corrector 800) corrects the first correlation addition (i.e. data from the RAM 405) data obtained by adding the output signals related to a plurality of rows in the predetermined direction by using the normalization coefficients. The correlation adder adds the output signal related to a row different from the plurality of rows and the first correlation addition data corrected by the corrector to generate the second correlation addition data. Then, the corrector (normalizer 801) corrects the second correlation addition data to cancel the normalization processing.

Preferably, the normalizer includes the first filter 401 that performs band-pass filtering processing in the first frequency band with respect to the first signal and the second signal. The correlation calculator performs the correlation calculation with respect to the first and second signals passing through the first filter 401. Preferably, the normalizer includes the second filter 500, the peak detector 501 (detector), and the calculator (normalization gain calculator 504). The second filter 500 performs band-pass filtering processing in the second frequency band including the first frequency band. The detector detects a peak value of each of the first and second signals passing through the second filter 500. The calculator calculates the normalization coefficient based on a signal output from the detector. More preferably, the normalizer includes the comparator 502 that compares the peak values of the first and second signals detected by the detector to output the signal corresponding to the larger peak value of the peak values. The calculator calculates the normalization coefficient based on the signal output from the comparator.

In the control apparatus of each embodiment, the corrector is not indispensable. That is, the control apparatus of each embodiment may not correct the correlation data to cancel the normalization processing in some cases. In this case, the control apparatus includes the normalizer and the correlation calculator. The normalizer includes the first filter, the second filter, the detector, and the calculator. The correlation calculator performs the correlation calculation on the first signal and the second signal that have passed through the first filter.

According to each embodiment, it is possible to provide a control apparatus, an image capturing apparatus, a control method, and a non-transitory computer-readable storage medium which are capable of performing highly accurate focus detection independently of a frequency component of a signal.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-151369, filed on Aug. 1, 2016, which is hereby incorporated by reference herein in its entirety.

What is claimed is:

1. A control apparatus comprising:
a controller having a processor which executes instructions stored in a memory or having circuitry, the controller being configured to function as:
a normalizer configured to perform normalization processing on a first signal and a second signal by using normalization coefficients related to the first signal and the second signal, respectively,
a correlation calculator configured to perform correlation calculation with respect to the normalized first and second signals,
a correlation adder configured to add the output signals from the correlation calculator, and
a corrector configured to correct correlation data, corresponding to the correlation addition data from the correlation adder, to cancel the normalization processing.

2. The control apparatus according to claim 1, wherein:
the normalizer is configured to control a normalization gain of each of the first signal and the second signal by the normalization processing, and
the corrector is configured to correct the correlation data to cancel the normalization gain.

3. The control apparatus according to claim 1,
wherein the correlation adder is configured to add the output signals in a predetermined direction within a range of a focus detection frame to output correlation addition data.

4. The control apparatus according to claim 3, wherein the predetermined direction is a direction orthogonal to a parallax direction.

5. The control apparatus according to claim 1, wherein:
the corrector is configured to correct first correlation addition data obtained by adding the output signals related to a plurality of rows in the predetermined direction by using the normalization coefficients,
the correlation adder is configured to add the output signal related to a row different from the plurality of rows and the first correlation addition data corrected by the corrector to generate second correlation addition data, and
the corrector is configured to correct the second correlation addition data to cancel the normalization processing.

6. The control apparatus according to claim 1, wherein:
the normalizer includes a first filter configured to perform band-pass filtering processing in a first frequency band with respect to the first signal and the second signal, and
the correlation calculator is configured to perform the correlation calculation with respect to the first and second signals passing through the first filter.

7. The control apparatus according to claim 6, wherein the normalizer includes:
a second filter configured to perform band-pass filtering processing in a second frequency band including the first frequency band,
a detector configured to detect a peak value of each of the first and second signals passing through the second filter, and
a calculator configured to calculate the normalization coefficient based on a signal output from the detector.

8. The control apparatus according to claim 7, wherein:
the normalizer includes a comparator configured to compare the peak values of the first and second signals detected by the detector to output the signal corresponding to the larger peak value of the peak values, and the calculator is configured to calculate the normalization coefficient based on the signal output from the comparator.

9. An image capturing apparatus comprising:

an image sensor including a first photoelectric converter and a second photoelectric converter that receive light beams passing through pupil regions of an image capturing optical system different from each other; and a controller having a processor which executes instructions stored in a memory or having circuitry, the controller being configured to function as:

an acquirer configured to acquire a first signal and a second signal that correspond to output signals from the first photoelectric converter and the second photoelectric converter, respectively, a normalizer configured to perform normalization processing on the first signal and the second signal by using normalization coefficients related to the first signal and the second signal, respectively, a correlation calculator configured to perform correlation calculation with respect to the normalized first and second signals, a correlation adder configured to add the output signals from the correlation calculator, and a corrector configured to correct correlation data, corresponding to the correlation addition data from the correlation adder, to cancel the normalization processing.

10. The image capturing apparatus according to claim 9, wherein the image sensor includes the first photoelectric converter and the second photoelectric converter with respect to each of microlenses, and the microlenses are arrayed in two dimensions.

11. A control method comprising:

performing normalization processing on a first signal and a second signal by using normalization coefficients related to the first signal and the second signal, respectively;

performing correlation calculation with respect to the normalized first and second signals;

performing addition of the output signals from the correlation calculation; and correcting correlation data, corresponding to the correlation addition data from the addition, to cancel the normalization processing.

* * * * *